Figures 4, 5:
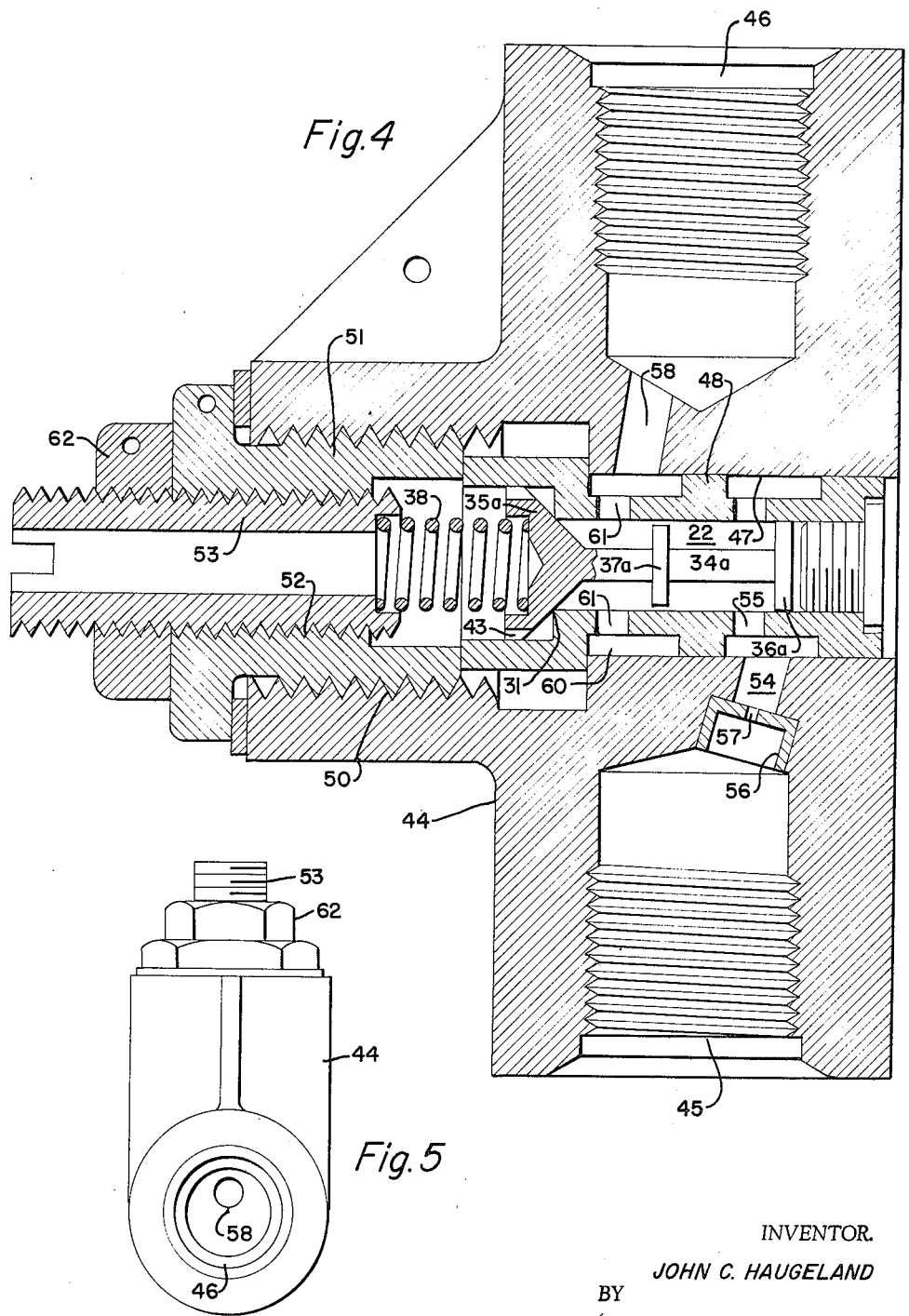

Nov. 16, 1965 J. C. HAUGELAND 3,217,732
BLEED-OFF REGULATOR
Filed Oct. 3, 1962 2 Sheets-Sheet 1
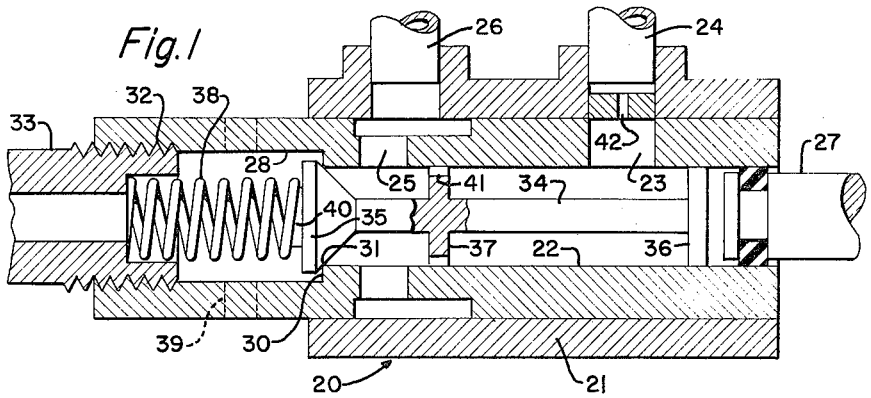
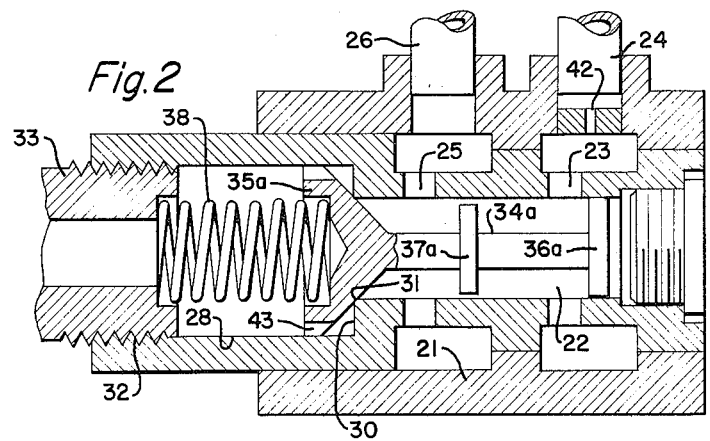
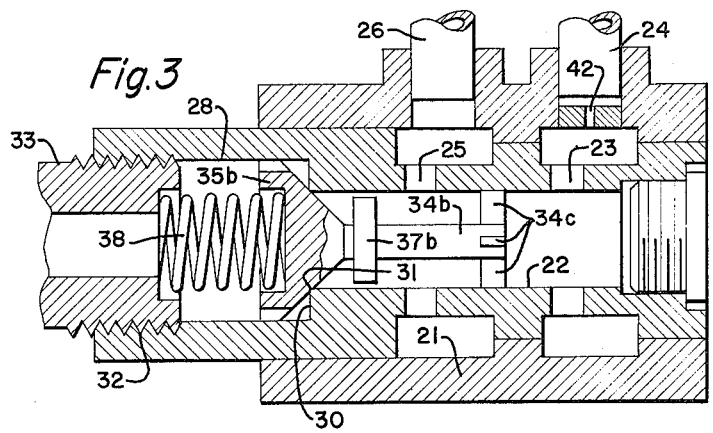
INVENTOR.
JOHN C. HAUGELAND
BY
*Herschel C. Omohundro*
ATTORNEY Nov. 16, 1965

J. C. HAUGELAND 3,217,732

BLEED-OFF REGULATOR

Filed Oct. 3, 1962

2 Sheets-Sheet 2

INVENTOR.
JOHN C. HAUGELAND
BY
Herschel C. Omohundro
ATTORNEY

United States Patent Office 3,217,732
Patented Nov. 16, 1965

3,217,732
BLEED-OFF REGULATOR
John C. Haugeland, Phoenix, Ariz., assignor to The Garrett Corporation, Los Angeles, Calif., a corporation of California
Filed Oct. 3, 1962, Ser. No. 228,107
12 Claims. (Cl. 137—117)

This invention relates generally to fluid pressure control mechanism and more particularly to means for regulating fluid pressure in a system utilizing such pressure. Still more particularly, the invention relates to a pressure regulator which may be used in a heated environment wherein temperatures are of the order of 600° F. and conventional regulators using flexible diaphragms or the like would not be reliable.

It is an object of this invention to provide a reference pressure regulator which will control pressures within very narrow limits, the regulator being of light weight and embodying a construction which will preclude or minimize to as great an extent as possible the vibration or buzzing frequently encountered in mechanism of this type.

It is also an object of this invention to provide a pressure regulator which will control pressures in such a manner that a minimum of deviation from the set pressure, commonly referred to as "droop," will occur, the regulator having means for compensating for or substantially counteracting such droop in the normal operation of the device.

A more specific object of the invention is to provide a bleed-off regulator having a bleed controlling element formed with means for causing an auxiliary pressure drop, the force of which is applied to the bleed controlling element in the operation of the regulator.

A still more specific object is to provide a bleed-off regulator embodying a bleed controlling element so constructed that the auxiliary pressure drop above mentioned will be proportional to a function of the flow through the regulator, and the droop inherent in a regulator not so constructed will be more effectively counteracted.

A further object of the invention is to provide a bleed-off regulator having a body forming a chamber with which inlet and regulated pressure ports communicate, the body also having a bleed outlet and a movable element yieldably biased to control flow through the bleed outlet, means being provided whereby flow from the inlet to the regulated pressure port and/or bleed outlet will cause a pressure drop, the force of which will be applied to the movable element to counteract the tendency of the regulated pressure to droop.

Another object of the invention is to provide the bleed-off regulator mentioned in the preceding paragraph with dashpot means for stabilizing the action of the movable element, so that the regulated pressure for which the device is set will be maintained with a minimum of variation regardless of change in supply pressure.

Still another object of the invention is to provide a bleed-off regulator construction which can be incorporated in a fluid pressure system line and will require no external support.

Other objects and advantages will be apparent from the following description of the forms of the invention selected for illustration in the accompanying drawings.

In the drawings:
FIGS. 1, 2 and 3 are schematic longitudinal sectional views of three embodiments of the invention;
FIG. 4 is a vertical longitudinal sectional view of a bleed-off regulator constructed for in-line use; and
FIG. 5 is an end elevational view of the regulator shown in FIG. 4.

Referring more particularly to the drawings, the numeral 20 designates generally the first form of the invention illustrated. The regulator shown schematically in FIG. 1 includes a body 21 formed of one or more pieces and having an internal chamber 22 formed therein. This chamber is of cylindrical shape, the body having an inlet port 23 with which a supply line 24 communicates, The body also includes a regulated pressure port 25 spaced longitudinally of the chamber 22 relative to the inlet port, the port 25 communicating with a line 26 forming a part of the fluid pressure system. The chamber 22 is closed at one end by an adjustable plug 27, the opposite end of the chamber being counterbored as at 28. This counterbore provides a shoulder 30, the inner edge of which forms a valve seat 31. The counterbore portion of the chamber is threaded at the outer end as at 32 for the adjustable reception of a spring abutment member 33. The chamber 22 slidably receives a spool valve element 34 which may be formed of one or more pieces and incorporates at one end a poppet valve head 35 and at the opposite end a dashpot piston and guide head 36. Between these heads the spool element is provided with a third head 37 which, when the valve spool in certain forms of the invention is operatively disposed in the chamber 22, will be located between the inlet and regulated pressure ports; in other forms of the invention this head is located between the regulated pressure port and the valve seat.

In the form of the invention shown in FIG. 1, the spool element is supported for sliding movement in the chamber by the heads 36 and 37. This movement permits a tapered surface on the poppet valve head 35 to cooperate with the seat 31 to control bleed flow from the chamber 22 to be counterbored portion thereof from which it may escape through a central opening in the member 33, vent 39, or other ports indicated by dotted lines in FIG. 1, in the body 21. The spool valve is urged toward a seat engaging position by a spring 38 which is disposed in engagement with the head 35 and the adaptor 33, the former having a spring locating button 40 thereon and the latter a recess for receiving the end portion of spring 38.

When the regulator is not in operation, the poppet valve will be engaged with the seat 31. As fluid under pressure is supplied to the regulator through the line 24, it will flow through the chamber 22, around the head 37, and to the regulated outlet port 25. When the system is completely charged with fluid, the pressure will increase, the force of the pressure being applied to the tapered portion of the head 35 and the portion of the dashpot head 36, which is not exposed to equal pressures, acting in opposite directions. This force will tend to move the valve spool toward an open position in opposition to the force of the spring 38. When the valve moves away from the seat, some of the fluid will flow around the valve head and bleed from the regulator through the central opening in the member 33 or other vent port. This bleed-off of fluid will be determined by the force or rate of the spring 38 to maintain a predetermined pressure at the regulated pressure port 25 and in the portion of the system communicating therewith. When fluid is used in the operation of the system, the spool element will move to maintain the regulated pressure. If the inlet pressure increases, the spool will move to bleed off the excess fluid so that the selected pressure for which the spring 38 has been calculated and adjusted by member 33 will be maintained.

To prevent the spool from undue movement when fluid pressure is utilized or inlet pressure varies, the dashpot head 36 has been provided. This dashpot head is disposed on the opposite side of the inlet port from the head 37, so that it will be between the inlet port and the closed end of the chamber 22. The head 36 may have sufficient clearance from the wall of the chamber or be formed with one or more openings to permit fluid to flow from one side to the other thereof at a reduced rate, the resistance to flow damping the movement or oscillation of the spool. When the spool moves in response to a tendency of the pressure to increase, the effective area exposed to pressure tending to open the valve may be decreased because of the taper on the poppet valve head and the flow of fluid. This reduction in effective area will cause the spool to move under the influence of the spring toward a closed position with the result that the pressure will tend to increase. The foregoing operation will again result. This action will take place quite rapidly, tending to make the spool vibrate. The dashpot previously mentioned will in part counteract this result.

When the inlet pressure at 24 rises sufficiently to cause the pressure at the outlet port 26 to exceed the calibrated pressure as determined by the setting of spring 38, the valve will open to bleed off the surplus air to maintain the regulated pressure at 26. This flow of air past the valve seat converts a portion of the static pressure acting on the beveled poppet surface into a velocity pressure. Since this velocity pressure does not create a static force on the beveled surface, part of the total pressure that would otherwise act on the bevel surface to open the valve is lost. This develops a pressure unbalance which tends to resist adequate opening of the valve to bleed off enough air to maintain regulated pressure. Hence, in the conventional bleed-off type regulator, the regulated pressure will rise (droop) somewhat as the inlet pressure rises because of the pressure unbalance that develops from increased bleed-off flow.

The head 37, sometimes referred to herein as the "droop compensating head," has been provided to offset this pressure unbalance characteristic by introducing another opposing pressure unbalance that is also sensitive to flow. In the form of the invention shown in FIG. 1, this head is shaped as at 41 by providing recesses or flat surfaces on one or more sides to permit a restricted communication between regions of chamber 22 at opposite sides of the head. This restricted communication provides or causes a pressure drop as the fluid flows past the head 37, and the force on the poppet caused by this pressure drop is also a function of flow and is in the opposite direction to the droop force previously described. Hence, by proper sizing of this orifice, the droop forces can be completely balanced out for all practical purposes. Also, the flow past the droop compensating head causes a flow damping force on the poppet which is a function of flow and changes of flow. This damping force causes the poppet to stabilize (i.e., resists poppet fluttering or oscillation—particularly troublesome with compressible fluids such as air), at all flow rates even without the use of separate damping devices such as the dashpot arrangement shown.

It will be noted from FIG. 1, as well as FIGS. 2–4, incl., that the inlet port is provided with an orifice 42 to limit the flow of fluid into the regulator. It should be obvious that while the restricted passages 41 are shown as being embodied in the head 37, they could, if desired, be formed in the body and still give the same results.

The action of the dashpot head may be modified slightly through the adjustment of the plug 27. Also, as mentioned previously, the force of the spring 38 may be varied through the adjustment of the member 33. This change in force will, of course, vary the regulated pressure.

The form of the invention shown in FIG. 2 is substantially identical with that shown in FIG. 1. Similar parts in these figures are identified by the same reference numerals. The difference between the regulators shown in these figures resides in the formation of the valve spool 34a. In FIG. 2 the poppet valve head 35a is made to slidably engage the wall of and be guided in the counterbore portion of the spool chamber. The head is relieved as at 43 to permit fluid bled from the bore 22 to pass the poppet valve head and flow to the atmosphere through the escape openings in the spring abutment 33 or body. The valve spool 34a will be supported for sliding movement by the poppet valve head and the dashpot head 36a. This construction will prevent overhang of the poppet valve head and possible friction which might occur in the FIG. 1 construction and permit the droop compensating head 37a to be so sized that the restricted communication between regions of the chamber at opposite sides thereof may take place between the periphery of the head and the wall of the chamber. The operation of this form of the invention will be identical with the operation of that shown in FIG. 1.

In the form of the invention shown in FIG. 3, the difference also resides in the spool construction. In this form, the spool 34b includes two heads and a plurality of guide or support vanes 34c. The first head is the poppet valve head 35b and the second the droop compensating head 37b. The head 35b and the vanes 34c are so made that they will support the spool for sliding movement in the chamber 22 and counterbore portion thereof. The poppet valve head 35b is identical with the poppet valve head 35a in the form shown in FIG. 2. The droop compensating head 37b is similar to the head 37a of the form of the invention shown in FIG. 2; that is, it is smaller in diameter than the chamber 22 to provide restricted communication between regions of the chamber 22 at opposite sides thereof. This head, however, is disposed between the bleed-off valve seat 31 and the regulated pressure port 25; it will be responsive to bleed flow to create a pressure drop and transmit force in an opening direction to the spool when fluid bleeds from the device. The pressure drop caused by this fluid flow will be added to the force of the fluid applied to the poppet valve head. Spool 34b may not be quite as stable in its operation as the spools provided with the dashpot head. The pressure regulating operations, however, will be satisfactory.

FIG. 4 shows the invention applied to a housing 44 which is formed for incorporation in a fluid line of a pneumatic system. This body will be completely supported by the line. It includes inlet and outlet ends 45 and 46 which have threaded bores to receive similarly threaded portions of the line. The housing has transversely extending central bore 47 for reception of the regulator body 48. This body provides the chamber 22 which receives a valve spool 34a which is identical with the valve spool shown in the form of the invention illustrated in FIG. 2. The housing is threaded as at 50 for the reception of a plug 51 which engages and retains the body 48 in position in the bore 47. This plug is in turn provided with a threaded opening 52 to adjustably receive the spring adaptor 53, this element corresponding with the members 33 in the other forms of the invention. The housing has an inlet port 54 extending from the inlet end 45 to an annular recess formed in the body 48, this recess communicating through ports 55 with the chamber 22. The housing has an insert 56 in a counterbored portion of the inlet port 54, the insert having a reduced opening 57 to restrict the flow of fluid into the regulator. A regulated pressure outlet passage 58 is also formed in the housing to establish communication between an annular groove 60, formed in the body 48, and the outlet 46. The groove 60 communicates through ports 61 with the chamber 22. It will be obvious from FIG. 4 that the regulator construction of this figure is substantially identical with that shown in the first three figures, but more particularly FIG. 2, the housing providing the major difference. The operation of the regulator will be identical with that of the other regulators shown. In FIGS. 4 and 5, a nut 62 is provided to maintain the adjustment of the member 53.

While several forms of the invention have been illustrated, the principles of operation are substantially identical. Other forms may also be provided without departing from the spirit and scope of the invention.

I claim:

1. A fluid pressure regulator comprising:
   (a) a body forming a chamber with a restricted inlet port, a regulated pressure port, and a bleed-off outlet having a valve seat;
   (b) a poppet valve supported for movement in said body to cooperate with said valve seat and control flow through said bleed-off outlet;
   (c) means resiliently urging said poppet valve toward a seat engaging position;
   (d) a droop compensating head fixed for movement with said poppet valve, said head being disposed between said inlet port and said regulated pressure port and valve seat; and
   (e) means establishing restricted communication between regions of said chamber at opposite sides of said head.

2. A fluid pressure regulator comprising:
   (a) a body forming a chamber with a restricted inlet port, a regulated pressure port, and a bleed-off outlet having a valve seat;
   (b) a tapered poppet valve supported for movement in said body to cooperate with said valve seat and control flow through said bleed-off outlet;
   (c) spring means resiliently urging said poppet valve toward a seat engaging position;
   (d) a droop compensating head fixed for movement with said poppet valve, said head being dispose between said inlet and regulated pressure ports and shaped to provide restricted communication between regions of said chamber at opposite sides of said head; and
   (e) means for varying the effective force of said spring means.

3. A fluid pressure regulator comprising:
   (a) a body forming a spool chamber with a restricted inlet port, a regulated pressure port, and a bleed-off outlet having a valve seat;
   (b) a spool element supported for movement in said spool chamber, said element having a groove communicating with the regulated pressure port and forming spaced heads, the first of which is disposed between said inlet and said regulated pressure port,
   (c) means forming an orifice establishing limited communication between the regions in said chamber on opposite sides of said first head;
   (d) a valve surface on the second of said heads, said valve surface being disposed to cooperate with said valve seat to control flow through said bleed-off outlet; and
   (e) means tending to resiliently urge said spool element in a direction to engage said valve surface with said seat.

4. A fluid pressure regulator comprising:
   (a) a body forming a spool chamber with a restricted inlet port, a regulated pressure port, and a bleed-off outlet having a valve seat;
   (b) a spool element supported for movement in said spool chamber, said element having a groove communicating with the regulated pressure port and forming spaced heads, the first of which is disposed between said inlet port and said regulated pressure port;
   (c) means forming an orifice establishing limited communication between the regions in said chamber on opposite sides of said first head;
   (d) a valve surface on the second of said heads, said valve surface being disposed to cooperate with said valve seat to control flow through said bleed-off outlet;
   (e) a first means tending to resiliently urge said spool element in a direction to engage said valve surface with said seat; and
   (f) second means for adjusting the force of said first means.

5. A fluid pressure regulator comprising:
   (a) a body forming a chamber with an inlet port for restricted fluid admission, a regulated pressure port, and a bleed-off outlet having a valve seat;
   (b) a poppet valve supported for movement in said body to cooperate with said valve seat and control flow through said bleed-off outlet;
   (c) means resiliently urging said poppet valve toward a seat engaging position;
   (d) a droop compensating head fixed for movement with said poppet valve, said head being disposed between said inlet and regulated pressure ports;
   (e) means establishing restricted communication between regions of said chamber at opposite sides of said head;
   (f) dashpot means operably connected with said poppet valve to stabilize operations thereof; and
   (g) means for adjusting said valve urging means to vary the force applied thereby to said valve.

6. A fluid pressure regulator comprising:
   (a) a body forming a chamber with an inlet port for restricted fluid admission, a regulated pressure port, and a bleed-off outlet having a valve seat;
   (b) a tapered poppet valve supported for movement in said body to cooperate with said valve seat and control flow through said bleed-off outlet;
   (c) spring means resiliently urging said poppet valve toward a seat engaging position;
   (d) a droop compensating head fixed for movement with said poppet valve, said head being disposed between said inlet and regulated pressure ports and sized to provide restricted communication between regions of said chamber at opposite sides of said head;
   (e) dashpot means operably connected with said poppet valve to stabilize operations thereof; and
   (f) means for varying the effective force of said spring means.

7. A fluid pressure regulator comprising:
   (a) a body forming a chamber with a restricted inlet port, a regulated pressure port and a bleed-off outlet having a valve seat;
   (b) a tapered poppet valve supported for movement in said body to cooperate with said valve seat and control flow through said bleed-off outlet;
   (c) spring means resiliently urging said poppet valve toward a seat engaging position;
   (d) a droop compensating head fixed for movement with said poppet valve, said head being disposed between said inlet and regulated pressure ports and shaped to provide restricted communication between regions of said chamber at opposite sides of said head;
   (e) a dashpot head also fixed for movement with said poppet valve and droop compensating head, said dashpot head being disposed on the opposite side of said inlet port from said droop compensating head; and
   (f) means for varying the effective force of said spring means.

8. A fluid pressure regulator comprising:
   (a) a body forming a chamber with a restricted inlet port, a regulated pressure port and a bleed-off outlet having a valve seat;
   (b) a tapered poppet valve supported for movement in said body to cooperate with said valve seat and control flow through said bleed-off outlet;
   (c) spring means resiliently urging said poppet valve toward a seat engaging position;

(d) a droop compensating head fixed for movement with said poppet valve, said head being disposed between said inlet and regulated pressure ports and shaped to provide restricted communication between regions of said chamber at opposite sides of said head;

(e) a dashpot head also fixed for movement with said poppet valve and droop compensating head, said dashpot head being disposed on the opposite side of said inlet port from said droop compensating head;

(f) means adjustable in said body to vary the operation of said dashpot head; and (g) means for varying the effective force of said spring means.

9. A fluid pressure regulator comprising:

(a) a body forming a cylindrical chamber with a restricted inlet port, a regulated pressure port, and a bleed-off outlet having a valve seat;

(b) a valve element with a head having a tapered seat engaging portion at one end and a dashpot piston head at the opposite end, said element being supported for movement in said chamber by said heads;

(c) spring means resiliently urging said valve element toward a position in which the tapered seat engaging portion engages said seat;

(d) a third head on said valve intermediate the first-mentioned heads, said third head being disposed between said inlet and regulated pressure ports and spaced from said chamber wall to provide restricted communication between regions of said chamber at opposite sides of said third head, said dashpot piston head being on the opposite side of said inlet port from said third head; and (e) means for varying the effective force of said spring means.

10. A fluid pressure regulator comprising:

(a) a body forming a cylindrical chamber closed at one end and counterbored at the other end, said body forming a restricted inlet port adjacent the closed end of said chamber, a regulated pressure port spaced from said inlet port, and a valve seat at the end of said chamber adjacent the counterbored end;

(b) a valve element with a first head portion slidable in said counterbore and a second head portion slidable in said chamber between said inlet and the closed end of said chamber, said valve element having a third head intermediate said inlet and said regulated pressure port, the latter head being constructed to provide restricted communication between regions of said chamber at opposite sides thereof, said first head portion having a tapered surface adjacent said valve seat; and (c) spring means resiliently urging said valve element toward a position in which the tapered portion of said first head engages said valve seat.

11. A fluid pressure regulator comprising:

(a) a body forming a chamber with an inlet port for restricted fluid admission, a regulated pressure port, and a bleed-off outlet having a valve seat, said regulated pressure port being disposed between said inlet port and said valve seat;

(b) a valve element supported for movement in said chamber to cooperate with said valve seat and control flow through said bleed-off outlet;

(c) resilient means normally urging said valve element toward a seat engaging position to close said bleed-off outlet, fluid pressure in said chamber tending to move said valve element in opposition to said resilient means to open said bleed-off outlet; and (d) means disposed in said chamber between said inlet and said regulated pressure port for creating a pressure drop in response to fluid flow from said inlet to said regulated pressure port, said pressure drop being applied by a part of said means to said valve element to assist the fluid pressure in moving the valve element in opposition to said resilient means to increase the opening of said bleed-off outlet.

12. A fluid pressure regulator comprising:

(a) a body forming an elongated chamber with a restricted inlet port, a regulated pressure port, and a bleed-off outlet port having a valve seat spaced longitudinally of the chamber, said regulated pressure port being disposed between said inlet and said bleed-off outlet ports;

(b) a spool element disposed for movement in said chamber having a valve head for cooperation with said valve seat to control fluid flow through said bleed-off outlet from said chamber;

(c) spring means normally urging said spool element in a direction to engage said valve head with said valve seat, fluid pressure in said chamber tending to move said spool element to disengage said valve head from said seat and bleed fluid from said chamber; and (d) means on said spool element between said inlet and regulated pressure ports to create a pressure drop in response to fluid flow from said inlet to said regulated pressure port, said pressure drop being applied to said spool element in a manner to assist said fluid pressure in moving said valve head away from said valve seat and increase the opening of said bleed-off outlet.

References Cited by the Examiner

UNITED STATES PATENTS

| 1,713,115 | 5/1929 | Cousino | 137—471 |
|---|---|---|---|
| 1,789,388 | 1/1931 | McMillan | 137—514.7 XR |
| 2,388,406 | 11/1945 | Haberland | 137—514.7 |
| 2,704,549 | 3/1955 | Strnad | 137—514 XR |
| 2,737,196 | 3/1956 | Eames | 137—115 XR |
| 2,969,084 | 1/1961 | Raymond | 137—471 |
| 3,024,798 | 3/1962 | Banker | 137—117 |
| 3,044,488 | 7/1962 | Mennesson | 137—514 |
| 3,053,271 | 9/1962 | Crittenden | 137—484.2 |

FOREIGN PATENTS 810,835  3/1959  Great Britain.

M. CARY NELSON, *Primary Examiner.*

MARTIN P. SCHWADRON, *Examiner.*